(12) United States Patent
Bates et al.

(10) Patent No.: US 8,184,663 B2
(45) Date of Patent: May 22, 2012

(54) MULTI-FORMAT STREAM RE-MULTIPLEXER FOR MULTI-PASS, MULTI-STREAM, MULTIPLEXED TRANSPORT STREAM PROCESSING

(75) Inventors: Matthew D. Bates, Austin, TX (US);
Steven B. Ehlers, Cedar Park, TX (US)

(73) Assignee: Entropic Communications, San Diego, CA (US)

( * ) Notice: Subject to any disclaimer, the term of this patent is extended or adjusted under 35 U.S.C. 154(b) by 1002 days.

(21) Appl. No.: 12/145,288

(22) Filed: Jun. 24, 2008

(65) Prior Publication Data

US 2008/0317118 A1 Dec. 25, 2008

Related U.S. Application Data

(60) Provisional application No. 60/946,122, filed on Jun. 25, 2007.

(51) Int. Cl.
*H04J 3/04* (2006.01)
*H04J 3/24* (2006.01)
(52) U.S. Cl. ................... 370/474; 370/535; 375/365
(58) Field of Classification Search ............ 375/365; 370/466, 474, 509, 535
See application file for complete search history.

(56) References Cited

U.S. PATENT DOCUMENTS

| | | | |
|---|---|---|---|
| 2002/0057900 A1* | 5/2002 | Nakajima | 386/94 |
| 2002/0064189 A1 | 5/2002 | Coupe | |
| 2002/0126711 A1 | 9/2002 | Robinett et al. | |
| 2003/0043919 A1* | 3/2003 | Haddad | 375/240.25 |
| 2003/0206553 A1 | 11/2003 | Surcouf | |
| 2005/0078950 A1 | 4/2005 | Yun | |
| 2005/0091697 A1* | 4/2005 | Tanaka et al. | 725/131 |
| 2006/0133774 A1* | 6/2006 | Toida | 386/75 |
| 2006/0209906 A1* | 9/2006 | Dabrowa | 370/535 |
| 2006/0292292 A1 | 12/2006 | Brightman et al. | |
| 2007/0143784 A1* | 6/2007 | Kubota et al. | 725/31 |
| 2007/0263990 A1* | 11/2007 | Haddad | 386/124 |
| 2007/0274223 A1* | 11/2007 | Cha et al. | 370/241 |
| 2008/0279215 A9* | 11/2008 | Wendling et al. | 370/465 |
| 2009/0138966 A1* | 5/2009 | Krause et al. | 726/21 |

OTHER PUBLICATIONS

O.W. Bungum, "Transmultiplexing, Transcontrol and Transscrambling of MPEG-2/DVB Signal," International Broadcasting Convention, London, GB, Sep. 12-16, 1996, Conference Publ. No. 428, pp. 288-293, IEE, 1996, XP 002040478.

Extended European Search Report dated Oct. 7, 2010 corresponding to the related European Patent Application No. 08795992.0.

PCT International Preliminary Report on Patentability dated Jan. 5, 2010 corresponding to the related PCT Patent Application No. US2008/068039.

* cited by examiner

*Primary Examiner* — Andrew Lee

(57) ABSTRACT

A device for transport stream processing is provided. The device includes a plurality of data inputs and a transport stream re-multiplexer for receiving a plurality of data streams from the plurality of data stream inputs and multiplexing the data streams into a transport stream. A transport stream processor receives the transport stream, de-multiplexes the transport stream to process one or more of the data streams, and provides the processed data stream to the transport stream re-multiplexer as one of the plurality of data streams.

20 Claims, 4 Drawing Sheets

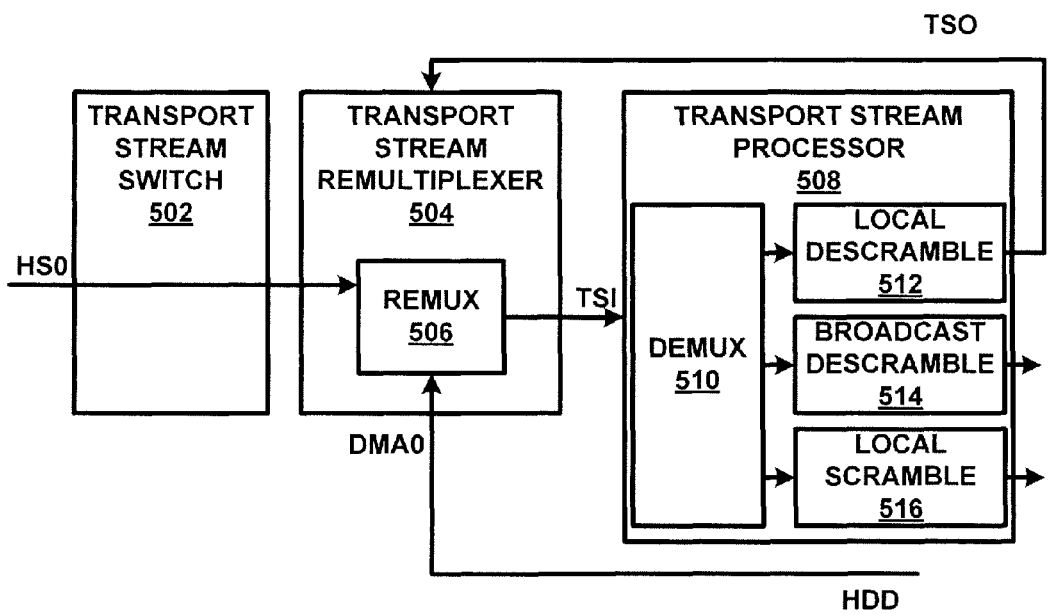
FIGURE 5    500
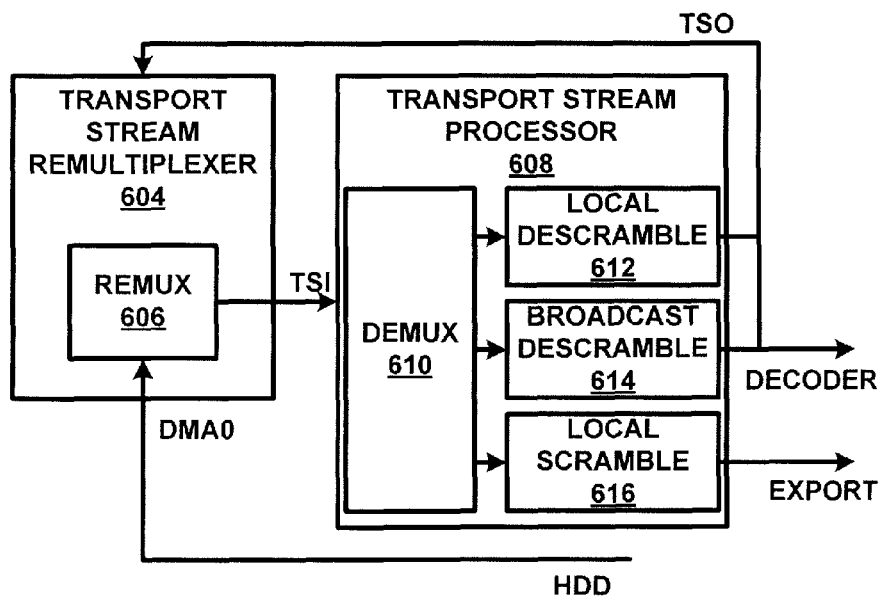
FIGURE 6    600

MULTI-FORMAT STREAM RE-MULTIPLEXER FOR MULTI-PASS, MULTI-STREAM, MULTIPLEXED TRANSPORT STREAM PROCESSING

RELATED APPLICATIONS

This application claims priority to U.S. Provisional patent application 60/946,122, filed Jun. 25, 2007 and entitled "Multi-Format Stream Re-Multiplexer For Multi-Pass, Multi-Stream, Multiplexed Transport Stream Processing," which is hereby incorporated by reference for all purposes.

FIELD OF THE DISCLOSURE

This disclosure relates to digital video encoding, and more specifically to a multi-format stream re-multiplexer for multi-pass, multi-stream, multiplexed transport stream processing.

BACKGROUND OF THE INVENTION

In digital video recorders, processing of the broadcast data stream may be required to remove broadcast scrambling before the broadcast data stream can be stored to a local hard drive. Likewise, additional scrambling can be performed prior to storing the program data on a local hard drive, and descrambling of the scrambled data must then be performed in order to play back the stored program data.

Conventional architectures for performing the scrambling and descrambling functions are often implementation-specific, and require multiple transport stream processors to perform the scrambling and descrambling. The requirement for a large number of transport stream processors not only increases the cost of the digital video recorder, but also makes a given digital video recorder architecture inapplicable for different media, such as in digital video broadcasting and digital satellite system architectures.

SUMMARY OF THE INVENTION

Accordingly, a transport stream re-multiplexer is provided that allows a single architecture to be used in systems for processing programs utilizing different broadcast standards, and which reduce the number of transport stream processors that are required to perform scrambling and descrambling of the transport streams.

In one exemplary embodiment of the present invention, a device for transport stream processing is provided. The device includes a plurality of data inputs and a transport stream re-multiplexer for receiving a plurality of data streams from the plurality of data stream inputs and multiplexing the data streams into a transport stream. A transport stream processor receives the transport stream, de-multiplexes the transport stream to process one or more of the data streams, and provides the processed data stream to the transport stream re-multiplexer as one of the plurality of data streams.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 5 is a diagram of a system for record and playback with a super-scrambled hard disk drive signal in accordance with an exemplary embodiment of the present invention;

FIG. 6 is a diagram of a system for triple pass processing for exporting a super-scrambled hard disk drive signal in accordance with an exemplary embodiment of the present invention.

DETAILED DESCRIPTION OF PREFERRED EMBODIMENTS

Figure 1:
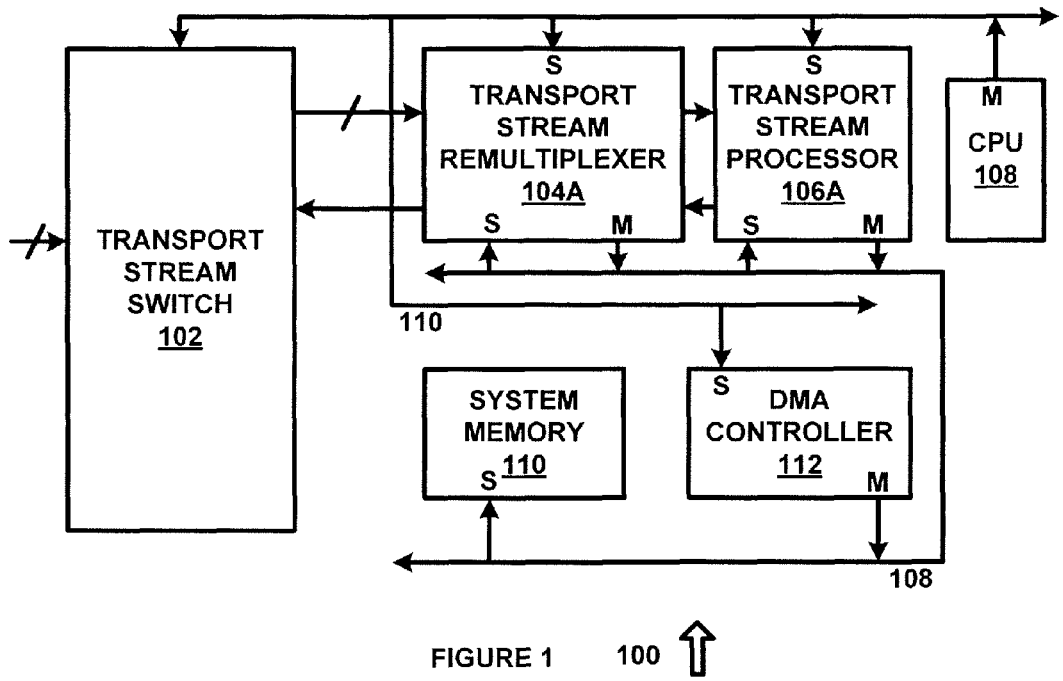
FIG. 1 is a diagram of a system for transport stream re-multiplexing in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for transport stream re-multiplexing in accordance with an exemplary embodiment of the present invention. System 100 can be implemented in hardware, software or a suitable combination of hardware and software, and can be one or more programmable discrete components. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 100 includes transport stream re-multiplexer (TSR) 104, which can process multiple transport streams, such as to perform multiple tasks on single transport streams, single tasks on multiple transport streams, or other suitable processes. To perform multiple tasks on a single transport stream (TS), transport stream re-multiplexer 104 is coupled to transport stream processor 106 via data buses TSI and TSO, and allow them to process a transport stream, which is then routed back to transport stream re-multiplexer 104 and re-multiplexed with the original transport stream. In this manner, transport stream processors 106 can make a second pass and perform additional processing on the transport stream.

As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), or other suitable connections.

To perform a single task on multiple transport streams, transport stream re-multiplexer 104 allows multiple transport streams to be re-multiplexed into a single transport stream before it is routed to transport stream processor 106.

Transport stream re-multiplexer 104 can re-multiplex multiple transport streams for handling by a single transport stream processor 106, can perform multi-pass de-multiplexing in a single transport stream processor 106 to support local scrambling/descrambling to the hard disk drive (HDD) or local network (LAN), can perform null packet insertion, can perform variable bit rate (VBR) to continuous bit rate (CBR) conversion, can perform mixed program streams (PS) and transport stream (TS) processing, and can perform other suitable functions.

System 100 accommodates digital video recorders that require the broadcast scrambling to be removed before data is stored to a HDD, which means both a descramble and scramble are required during the record phase. System 100 also accommodates digital video recorders that require that the broadcast scrambling be maintained on the HDD which means the TS must be descrambled twice at playback time. System 100 also accommodates digital video recorders that require that three passes are made on one stream to remove the local scrambling, remove the broadcast scrambling then reapply the local scrambling for export to another decoder. As such, system 100 provides a single solution that can be utilized in a number of different existing or future digital video recording architectures.

Transport stream re-multiplexer 104 can be configured to provide multiple input first-in, first-out buffers that are sourced from external inputs via transport stream switch (TSS) 102 outputs, direct memory access (DMA) outputs, or transport stream outputs from transport stream processor 106. Transport stream re-multiplexer 104 can also provide multiple outputs, such as one to the transport stream processor 106 transport stream input, and one to transport stream switch 102. Transport stream re-multiplexer 104 can perform auto or external synchronization to packet header, packet identifier (PID) filtering (such as from a table of 64 PIDs for each transport stream re-multiplexer or other suitable configurations), PID remapping from a PID value to PID and stream indices. Transport stream re-multiplexer 104 can also perform stream arbitration to control re-multiplexing order, can capture PID filtered transport streams to main memory, can manage transport stream overflow to main memory for bit rate smoothing, can repackage program streams (PS) into transport streams for re-multiplexing, and can perform other suitable functions.

Transport stream re-multiplexer 104 receives transport stream input from transport stream switch 102, which can receive input from one or more network interface modules (NIMs), high speed data ports (HSDPs), from transport stream processor 106 transport stream output (TSO), from the system direct memory access (DMA) controller, or from other suitable sources.

Transport stream re-multiplexer 104 feeds a transport stream output back to transport stream switch 102 (which can output to a high speed data port), to transport stream processor 106 transport stream input (TSI), or to other suitable components. Transport stream re-multiplexer 104 can also access system memory, either as an overflow device for the various input FIFO buffers or for capture of the filtered transport stream to system memory buffers. For DMA sources, transport stream re-multiplexer 104 can repackage a program stream (or any suitable raw data) into a transport stream by dividing the data into 184 byte payloads and adding a 4 byte header, or using other suitable data packet configurations.

Transport stream re-multiplexer 104 can process digital video broadcasting (DVB) 188 byte transport packets, digital satellite service (DSS) 130 byte transport packets, or other suitable transport packets. In order to support multiple or mixed types of transport packets, transport stream re-multiplexer 104 can convert one type of transport packet into a different type of transport packet, such as DSS transport packets into DVB transport packets or other suitable conversions. This conversion allows microcode or other components of transport stream processor 106 to process DVB, DSS or other suitable transport packets simultaneously.

In addition, transport stream re-multiplexer 104 can support an "alternate transport packet" specification with a different sync byte and different packet length. In one exemplary embodiment, alternate transport packets can be processed as DVB transport packets if they are compatible with the DVB packet identifier definition. In this manner, features such as additional control bytes can be appended to alternate transport packets. Transport stream re-multiplexer 104 can also process program streams by repackaging the data into 188 byte DVB transport packets or in other suitable manners.

Bus 110 is used for configuration by the host CPU 108, and bus 108 for data traffic to system memory 110 or from DMA controller 112.

Figure 2:
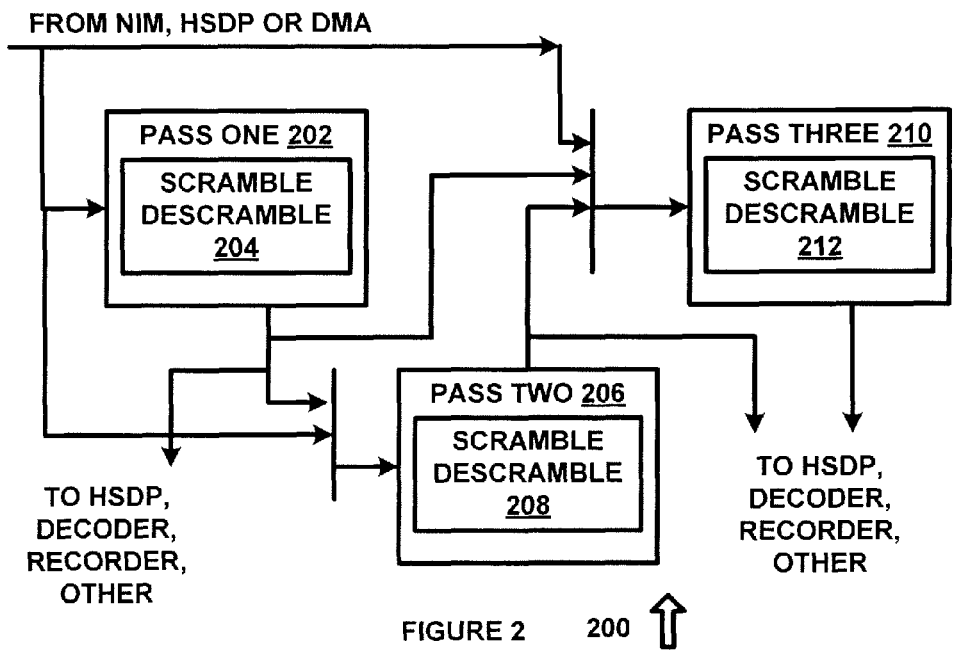
FIG. 2 is a diagram of a system for multi-pass de-multiplexing in accordance with an exemplary embodiment of the present invention.

FIG. 2 is a diagram of a system 200 showing data flows for multi-pass de-multiplexing in accordance with an exemplary embodiment of the present invention. Multi-pass de-multiplexing allows a highly flexible topology of scrambling, descrambling, de-multiplexing and routing.

System 200 includes pass one 202, pass two 206 and pass three 210 and associated scramble/descramble 204, scramble/descramble 208 and scramble/descramble 212, respectively. In one exemplary embodiment, pass one 202, pass two 206 and pass three 210 and associated scramble/descramble 204, scramble/descramble 208 and scramble/descramble 212 represent the same physical resource, such as a transport stream processor or other suitable resources.

In one exemplary embodiment, input from a network interface module (NIM), a high speed data port, direct memory access or other sources is provided to pass one 202 for processing by scramble/descramble 204. The output from pass one 202 is provided to pass two 206 and pass three 210, as well as to decoders, a recorder, a high speed data port, or other suitable destinations. Likewise, scramble/descramble 208 of pass two 206 generates an output that is provided to pass three 210 and other suitable destinations, and the final output from scramble/descramble 212 of pass three 210 is output to suitable destinations.

Hard disk drive scrambling utilizes a local scrambling algorithm that is applied to the transport stream before it is stored on the disk. If the broadcast scrambling is not removed before hard disk drive scrambling, this process can be referred to as super-scrambling. Transport stream re-multiplexer 104 assist with hard disk drive scrambling by allowing transport stream processor 106 to perform multiple passes on the transport stream.

While three passes could be done in a single pass three-stage pipeline, in some circumstances the broadcast and local algorithms are the same, which would require three instantiations of the scrambler/descrambler in each transport stream processor. Another problem with such a pipeline architecture is that some applications require multiple taps off the pipeline (one after each stage), which would require significant modification to transport stream processor 106 hardware and microcode. To avoid these problems, transport stream re-multiplexer 104 allows transport stream processor 106 to use the same scrambler/descrambler for each pass.

When a transport stream is returned to transport stream re-multiplexer 104 after each pass, the PID is remapped so that transport stream processor 106 can identify which pass it must perform when it sees it again.

Figure 3:
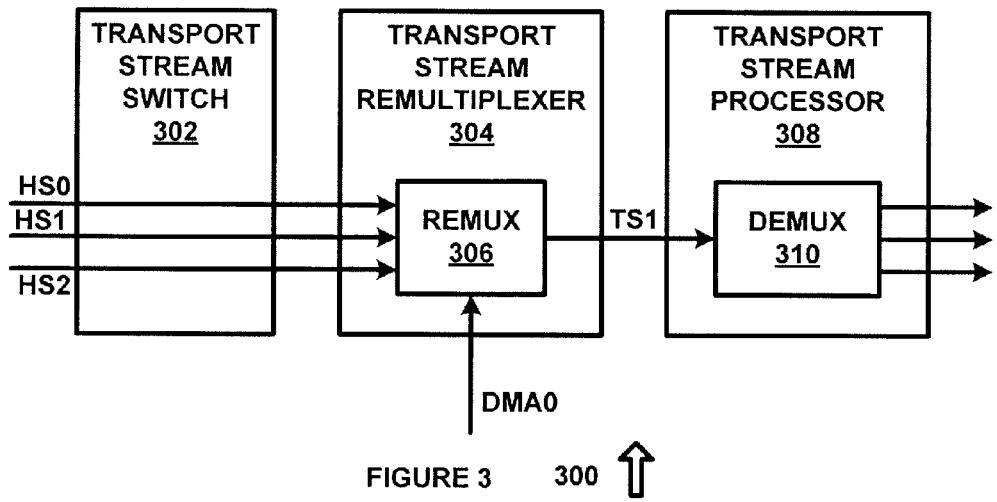
FIG. 3 is a diagram of a system for triple record plus playback in accordance with an exemplary embodiment of the present invention.

FIG. 3 is a diagram of a system 300 for triple record plus playback in accordance with an exemplary embodiment of the present invention. System 300 allows a single transport stream processor 308 to process the recording of multiple inputs so as to share expensive resources, such as descramblers. High speed data inputs HS0, HS1 and HS2 and direct memory access input DMA0 are provided by transport stream switch 302 to transport stream re-multiplexer 304, which re-multiplexes the data inputs using re-multiplexer 306 into a single transport stream TSI. Transport stream processor 308 receives and de-multiplexes transport stream TSI to process the recording of multiple inputs so as to share resources of transport stream processor 308. System 300 provides a flexible architecture that can be readily adapted based on the specific design needs for an application.

Figure 4:
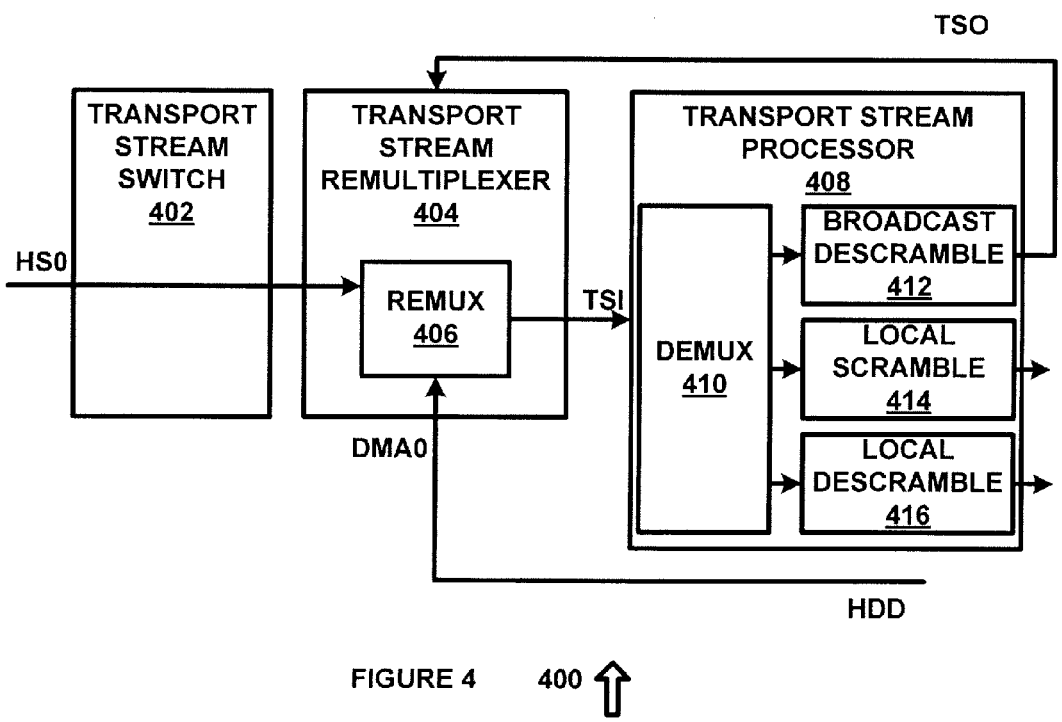
FIG. 4 is a diagram of a system for record and playback with a local scrambled hard disk drive signal in accordance with an exemplary embodiment of the present invention.

FIG. 4 is a diagram of a system 400 for record and playback with a local scrambled hard disk drive signal in accordance with an exemplary embodiment of the present invention. Transport stream re-multiplexer 404 receives high speed data signal HS0 through transport stream switch 402 in addition to a scrambled hard disk drive data signal DMA0, and re-multiplexes the signals with re-multiplexer 406 to generate transport stream TSI. Transport stream processor 408 receives transport stream TSI and de-multiplexer 410 separates the streams for processing by broadcast descramble 412, local scramble 414 and local descramble 416. The high speed signal output TSO of broadcast descramble 412 is provided to transport stream re-multiplexer 404, so that it can be re-provided to transport stream processor 408 for subsequent processing by local scramble 414 or local descramble 416. The output of local scramble 414 is output to a suitable destination, such as a hard disk drive, and the output of local descramble 416 is output to a suitable destination, such as a decoder.

FIG. 5 is a diagram of a system 500 for record and playback with a super-scrambled hard disk drive signal in accordance with an exemplary embodiment of the present invention. System 500 includes transport stream re-multiplexer 504, which receives high speed data signal HS0 through transport stream switch 502, and which re-multiplexes the signal HS0 with a local descrambled signal TSO and a hard disk drive signal DMA0 to generate transport stream signal TSI. De-multiplexer 510 of transport stream processor 508 de-multiplexes transport stream signal TSI to provide signals to local descramble 512, broadcast descramble 514 and local scramble 516. The output of local descramble 512 is then provided back to transport stream re-multiplexer 504 as TSO, for subsequent re-multiplexing and processing by broadcast descramble 514. The output of broadcast descramble 514 is output to a suitable destination, such as a decoder, and the output of local scramble 516 is output to a suitable destination, such as a hard disk drive.

FIG. 6 is a diagram of a system 600 for triple pass processing for exporting a super-scrambled hard disk drive signal in accordance with an exemplary embodiment of the present invention. Transport stream re-multiplexer 604 receives a super-scrambled hard-disk drive signal DMA0, which is re-multiplexed by re-multiplexer 606 with additional signals to provide transport stream signal TSI. De-multiplexer 610 of transport stream processor 608 receives transport stream signal TSI and de-multiplexes the signal to generate outputs to local descramble 612, broadcast descramble 614 and local scramble 616. The output of local descramble 612 is provided as signal TSO to transport stream re-multiplexer 604, and the output of broadcast descramble 614 is output back to re-multiplexer 606 of transport stream re-multiplexer 604 for subsequent local scrambling. The output from local scramble 616 is exported to a suitable destination.

Figure 7:
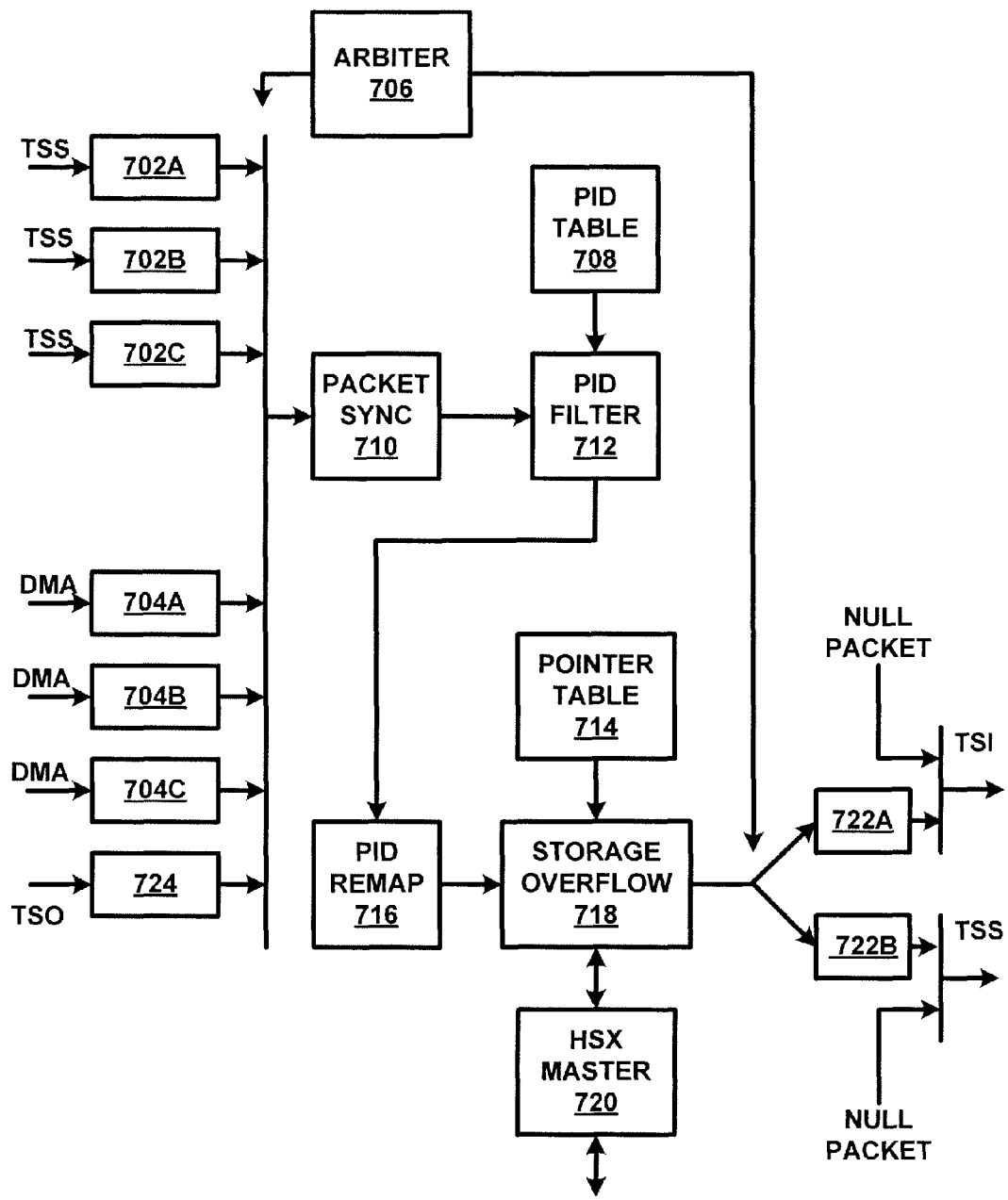
FIG. 7 is a diagram 700 of a transport stream re-multiplexer showing a method for null packet insertion in accordance with an exemplary embodiment of the present invention.

FIG. 7 is a diagram of TSR 700 including a method for null packet insertion in accordance with an exemplary embodiment of the present invention. Null packet insertion allows a transport stream re-multiplexer to accept a variable bit rate (VBR) transport stream and fill the transmission gaps with NULL packets. A variable bit rate transport stream is a stream with bursts of data that can include gaps where no data is present of arbitrary length between data packets. After null packet insertion, the transport stream can be processed as a constant bitrate (CBR) transport stream.

Variable bit rate to constant bit rate conversion can be used to prevent transport stream processor microcode from stalling because of the transmission gaps in the data. Variable bit rate to constant bit rate conversion can also be used to generate a constant bit rate stream at the high speed data port output from an internal variable bit rate transport stream. For example, a filtered transport stream recorded to a hard disk drive can inherently be variable bit rate data, but when playing the filtered transport stream back it is desirable to transmit a constant bit rate transport stream.

System 700 allows null packets insertion to be suspended unless there is sufficient room in the output FIFO buffers for null packet insertion. Input FIFO buffers 702A through 702C, 704A through 704C and 724 can provide at least two functions. One function is to synchronize to the external interface from transport stream switch and direct memory access data signals, and a second function is to buffer the instantaneous data rate.

Transport stream switch FIFO buffers 704A through 704C are sized to handle the real-time data rate while they are not in context, and the transport stream output FIFO buffer 724 and direct memory access FIFO buffers 704A through 704C sized to allow them to hold an entire packet. Direct memory access FIFO buffers 704A to 704C can accept any byte alignment of data, such as where both the address and transaction size can be any suitable number of bytes.

Arbiter 706 determines the order in which to re-multiplex the data stored in input FIFO buffers 702A through 702C, 704A through 704C and 724, as a function of input FIFO data levels, output FIFO buffers 722A and 722B data levels, and suitable priority schemes. One exemplary priority scheme is where arbiter 706 cycles through each input in order and services any of input FIFO buffers 702A through 702C, 704A through 704C and 724 that have at least a whole packet available and which have an associated destination that is available to accept a packet.

Null packets are arbitrated by an independent process. If null packet insertion is enabled and there are no input or fetched packets ready and the destination's input FIFO has sufficient room, then the TSR will insert a null packet into the output.

Packet sync 710 handles synchronization to the transport stream. In the case of transport stream switch or TS0 inputs, this can be an 'external sync' where the sync is derived from the sync signal, or in all cases this can be an 'auto-sync,' where the sync is derived from the data. Both external sync and auto sync support DVB or DSS synchronization processes. Auto-sync works by keeping a candidate table for every possible byte position and eliminating candidates until only one remains.

Packet sync 710 can be disabled per stream for "raw mode" where no sync will be required, although the data will still be packetized for commonality with other streams. In one exemplary embodiment, the packet size can be 188 bytes or other suitable values. Packet sync 710 can be permitted to consume up to one packet's worth of data before yielding to arbiter 706, other suitable timing can be utilized. A packet sync context can be held for each input stream so that the sync process can pick up from where it left off.

PID filter 712 determines whether to keep or discard transport packets based on the PID value. The transport stream re-multiplexer can match PIDs by value or by reference. When matching occurs by value, the transport stream re-multiplexer can search for the PID in PID table 708. When matching occurs by reference, the PID has already been mapped to an index of PID table 708, does not need to be matched again.

In one exemplary embodiment, PID table 708 can be implemented as random access memory that holds up to 64 PIDs and associated data. Each entry can include an enable bit and a stream identifier that indicates the stream that the PID applies to.

PID remap 716 optionally replaces the 13 bits (12 bits in the DSS case) in the packet header with an index instead of the PID. Remapping relieves the transport stream processor from having to perform a PID search when it processes the packet because it can use the value it finds in the header to directly specify the PID index. Remapping also prevents PID collision between transport streams by ensuring all PIDs are remapped to a unique value across all transport streams.

In one exemplary embodiment, the 16 bits in the transport packet header (after the 0x47 in the DVB case) can be remapped as follows, or other suitable remapping can also or alternatively be used:

| Bits | Description |
|------|-------------|
| 5:0 | PID Index |
| 7:6 | Stream Source |
|     | 00 = TSS Input |
|     | 01 = DMA Input |
|     | 10 = TSP TS Output |
|     | 11 = Reserved |
| 9:8 | Stream Index |
| 11:10 | Pass Index |
| 12 | Reserved (not part of PID in DSS headers) |
| 15:13 | Reserved (not part of PID in DVB or DSS headers) |

When remapping a PID that has already been remapped, the pass index can be incremented by one. In addition to PID remapping this block can also be used to repackage DSS packets into DVB packets to allow the transport stream processor to process both packet types simultaneously without having to know the packet type in advance.

When repackaging, the remapping can remap the DVB PID, the DSS service channel identifier (SCID), both the DVB PID and the DSS SCID, or other suitable data. If the DVB PID is not remapped, then it is a copy of the original DSS SCID. In one exemplary embodiment, the DVB or repackaged DSS packet can have a transport error indicator bit inserted according to the state of the external error pin on the sync byte.

For DSS to DVB TS repackaging, an adaptation field control (ADFC) byte can be added with the transport_scrambling_control bits set to clear (00), the adaptation_field_control bits set to no adaptation field, payload only (01), and the continuity counter incrementing appropriately per PID, as shown below, or in other suitable manners:

| 0 | 1 | 3 | 4 | 6 | 134 | 187 |
|---|---|---|---|---|-----|-----|
| 0x47 | PID | ADFC | SCID | DSS Payload | Stuffing | |

When performing program stream (PS or raw data) to DVB transport stream repackaging, the transport stream re-multiplexer can add a 4 byte header to every 184 bytes of payload. The PID used can be from PID table 708. The transport stream re-multiplexer can use the first PID it finds that matches the stream type, stream index and has the program stream PID bit enabled. If no PID table 708 entry matches, the transport stream re-multiplexer can use a PID index of zero but with the stream type, stream index and pass index set correspondingly. The ADFC byte can be set in the same manner as the DSS repackaging case, or in other suitable manners:

| 0 | 1 | 3 | 4 | 187 |
|---|---|---|---|-----|
| 0x47 | PID | ADFC | PS Payload | |

Storage overflow 718 can handle either direct storage to system memory buffers of filtered transport streams, can act as an overflow buffer for the input FIFO buffers 702A through 702C, 704A through 704C and 724, or can perform other suitable functions.

If the transport stream re-multiplexer detects that a transport stream switch input FIFO buffer 702A through 702C is overflowing because it can not get serviced by the transport stream processor, then it can overflow to a system memory buffer. Subsequent servicing of the output FIFO buffers 722A and 722B can then be from memory until the memory buffer is exhausted at which point the processing can revert to on-chip buffering.

Pointer table 714 holds write, read, start and end pointers for each TSS input. The read and write pointers have selectable wrap counters in the upper bits, such as where wrap counters can be between zero and four bits and the remaining bits (28 to 32) form the system memory address. Other suitable configurations can also or alternatively be used. In FIFO overflow mode, the transport stream re-multiplexer manages the read and write pointers itself. In capture mode, the transport stream re-multiplexer manages only the write pointer and the read pointer can be updated by another processor.

The transport stream re-multiplexer can support multiple output instances simultaneously, such as a transport stream switch output (such as to transmit output back to the transport stream switch for high speed data port output), an output to the transport stream processor's transport stream input, or other suitable outputs. The inputs can be mapped as needed to the outputs. The transport stream re-multiplexer can also perform time-slicing between the two outputs.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A device for transport stream processing comprising:
a plurality of data inputs;
a transport stream re-multiplexer for receiving a plurality of data streams from the plurality of data stream inputs and multiplexing the data streams into a transport stream; and
a transport stream processor for receiving the transport stream, de-multiplexing the transport stream to process one or more of the data streams, and to provide the processed data stream to the transport stream re-multiplexer as one of the plurality of data streams;
wherein the transport stream re-multiplexer further comprises a packet identifier remap system for replacing a packet identifier of a data packet with an index.

2. The device of claim 1 wherein the transport stream re-multiplexer further comprises an arbiter applying a priority scheme to the plurality of data streams inputs.

3. The device of claim 1 further comprising a transport stream switch providing a high speed data stream as one of the plurality of data streams.

4. The device of claim 1 further comprising a hard disk drive providing a data stream as one of the plurality of data streams.

5. The device of claim 1 wherein the transport stream processor further comprises a broadcast descrambler system for descrambling a broadcast data stream.

6. The device of claim 1 wherein the transport stream processor further comprises a local descrambler system for descrambling a local data stream.

7. The device of claim 1 wherein the transport stream processor further comprises a local scrambler system for scrambling a data stream for local storage.

8. A device for transport stream processing comprising:
a transport stream re-multiplexer for receiving a plurality of data streams and multiplexing the data streams into a transport stream; and
a transport stream processor for receiving the transport stream, de-multiplexing the transport stream to process one or more of the data streams, and to provide the processed data stream to the transport stream re-multiplexer as one of the plurality of data streams;
wherein the transport stream re-multiplexer further comprises a packet identifier remap system for replacing a packet identifier of a data packet with an index.

9. The device of claim 8 wherein the transport stream re-multiplexer further comprises an arbiter applying a priority scheme to the plurality of data streams inputs.

10. The device of claim 8 wherein the transport stream re-multiplexer further comprising a null packet insertion system for converting a variable bit rate transport stream into a constant bit rate transport stream.

11. The device of claim 8 wherein the transport stream processor is for receiving the transport stream, de-multiplexing the transport stream to process one or more of the data streams, and to provide the processed data stream to the transport stream re-multiplexer as one of the plurality of data streams by utilizing the index instead of the packet identifier.

12. The device of claim 8 wherein the device is configured to descramble a broadcast data stream.

13. The device of claim 8 wherein the device is configured to descramble a local data stream.

14. The device of claim 8 wherein the device is configured to scramble a data stream for local storage.

15. The device of claim 8 further comprising an arbiter that applies a priority scheme to the plurality of data streams inputs.

16. The device of claim 8 further comprising a transport stream switch providing a high speed data stream as one of the plurality of data streams.

17. The device of claim 8 further comprising a hard disk drive providing a data stream as one of the plurality of data streams.

18. A device for transport stream processing comprising:
a plurality of data inputs;
means for receiving a plurality of data streams from the plurality of data stream inputs and multiplexing the data streams into a transport stream; and
a transport stream processor for receiving the transport stream, de-multiplexing the transport stream to process one or more of the data streams, and to provide the processed data stream as one of the plurality of data streams; and
means for replacing a packet identifier of a data packet with an index.

19. The device of claim 18 wherein a priority scheme is applied to the plurality of data streams inputs.

20. The device of claim 18 wherein a high speed data stream is provided as one of the plurality of data streams.

* * * * *